Feb. 16, 1926.
L. R. ROSENBAUM
DEMOUNTABLE WHEEL RIM
Filed Oct. 25, 1920
1,573,746
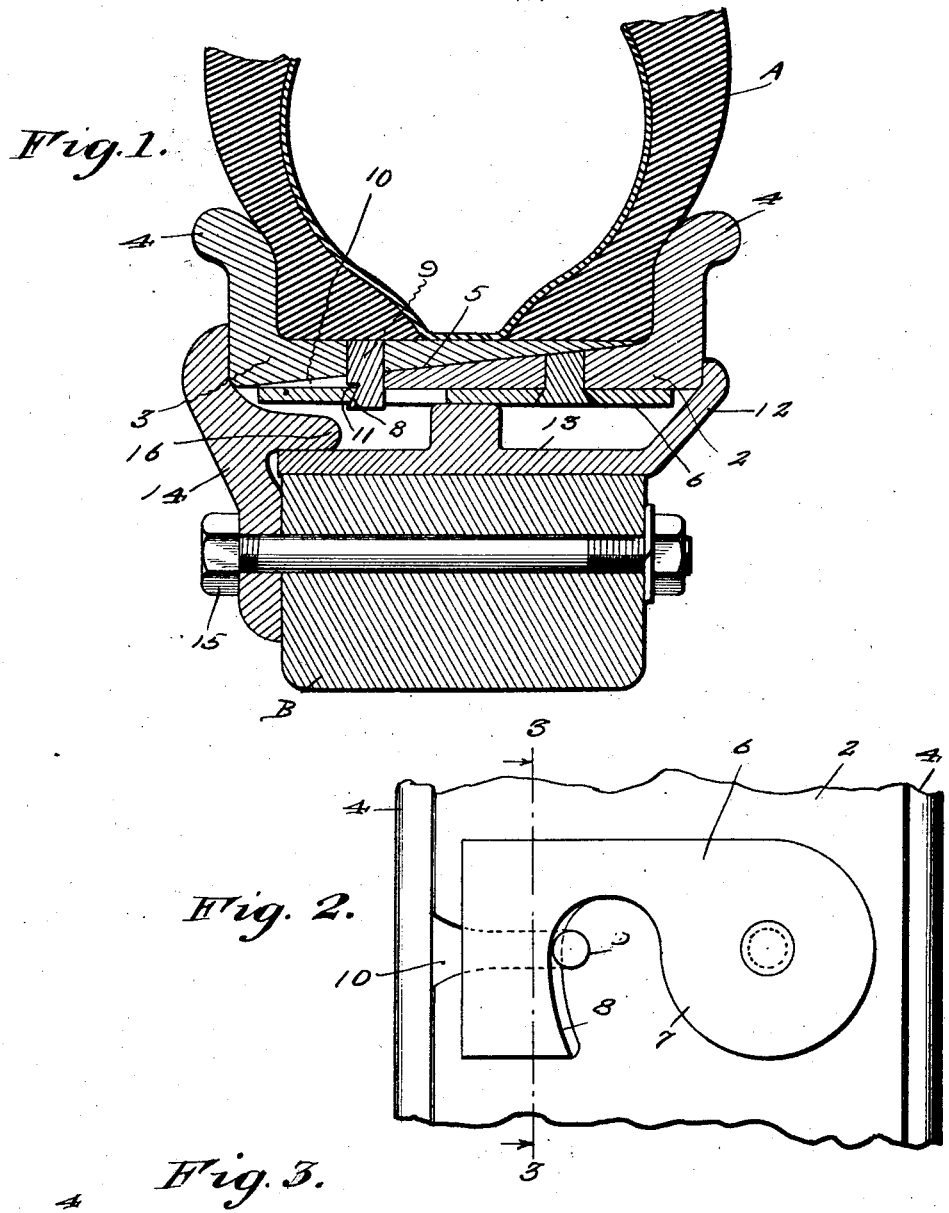
L. R. Rosenbaum INVENTOR Patented Feb. 16, 1926.

1,573,746

UNITED STATES PATENT OFFICE.

LEO R. ROSENBAUM, OF CAMPBELLSPORT, WISCONSIN.

DEMOUNTABLE WHEEL RIM.

Application filed October 25, 1920. Serial No. 419,285.

*To all whom it may concern:*

Be it known that I, LEO R. ROSENBAUM, a citizen of the United States, residing at Campbellsport, in the county of Fond du Lac and State of Wisconsin, have invented new and useful Improvements in Demountable Wheel Rims, of which the following is a specification.

This invention relates to demountable wheel rims for use upon motor vehicles and an object of the invention is to provide a rim of relatively great stability and one which may be quickly assembled and disassociated.

Another object of the invention is the provision of novel means for securely clamping the engaging surfaces of a pair of rim sections, which sections are provided with cam surfaces or rings so that in assembling all parts will be moved into substantial relation.

Another feature of the invention is the adjustability of the tire clamping rings of the rim structure and their adjustable association with the other parts so that a tire can be effectively gripped.

Other objects of the invention will appear in the following detailed description and in the accompanying drawings wherein:

Fig. 1 is a section through the rim showing it applied.

Fig. 2 is a fragmentary section through the rim.

Fig. 3 is a fragmentary bottom plan of the improved rim.

Referring more particularly to the drawings, the improved demountable rim comprises a pair of companion rings 2 and 3, each of which is provided with a clincher flange 4 for engaging a tire as indicated at A. The rings 2 and 3 are provided with co-acting inclined surfaces 5 so as to increase the effective gripping of the rings when in applied position. To further assist in securely clamping the rings 2 and 3 in tire engaging and carrying position, hooks 6 are provided connected to the inner surface of the ring 2 at circumferentially spaced points thereon. The hooks 6 are provided with cut out portion 7 which have cam edges 8 adapted to co-act with pins 9 carried by the ring 3. The ring 2 is provided with cut out portions 10 extending inwardly from its thin edge and opening out through the thin edge to permit the ring 2 to be moved into tire clamping position with its inclined surface engaging the inclined surface of the ring 3 and with the pins 9 engaging in cutout portions 10. The pins 9 are provided with undercut shoulders 11 adapted to engage the cam edges 8 of the cutout portions 7. As clearly shown in Fig. 3 of the drawings, the cammed edges 8 are curved so that when the rings 2 and 3 are in co-operating relation, and the pawls 6 are swung into locking position the cam edges 8 riding over the undercut shoulders 11 will force the clincher flanges 4 towards each other and also force the inclined surfaces 5 into snug fit engagement causing the rings 2 and 3 to be brought into firm engagement, one with the other, and with the tire A.

The ring 2 engages against the inclined flange 12, which is formed on the ring 13. The band 13 is permanently carried by a wheel felly B and co-acts with the clamping member 14 which is of annular configuration and is bolted to the felly B as indicated at 15 and is provided with a wedge shaped annular projection 16 which engages between the rings 2 and 3 and the band 13 so that when adjusted the cam action of the projection 16 and the cam action of the flange 12 will co-act and rigidly hold the rings 2 and 3 against displacement.

From the foregoing description taken in connection with the accompanying drawing it will be apparent that I have provided a demountable vehicle wheel rim of few parts substantially associated and capable of withstanding excessive strain and which may be assembled or disassociated in a minimum amount of time.

It is, of course, to be understood that the invention may be constructed in various other manners and the parts associated in other relations and, therefore, I do not desire to be limited in any manner except as set forth in the claim hereunto appended.

Having thus described my invention what I claim is:

In a tire rim, outer and inner sections disposed in overlapping relation, pins carried by the outer section, the inner section having slots accommodating said pins, the pins having surfaces inclined inwardly of the pins from the outer ends thereof, and hooks pivoted to the inner section and having portions inclined similarly to and engaging with the inclined surfaces of said pins.

In testimony whereof I affix my signature.

LEO R. ROSENBAUM.